United States Patent [19]
Suda

[11] Patent Number: 5,193,394
[45] Date of Patent: Mar. 16, 1993

[54] TRANSDUCING DEVICE FOR ACCURATELY TRANSDUCING A PHYSICAL QUANTITY INTO AN ELECTRIC SIGNAL

[75] Inventor: Masahiro Suda, Tokyo, Japan

[73] Assignee: NEC Corporation, Tokyo, Japan

[21] Appl. No.: 652,824

[22] Filed: Feb. 8, 1991

[30] Foreign Application Priority Data

Feb. 8, 1990 [JP] Japan .................................... 2-30139

[51] Int. Cl.$^5$ ................................................. G01B 7/16
[52] U.S. Cl. ......................................... 73/766; 73/727
[58] Field of Search .................. 73/727, 766, 777, 763

[56] References Cited

U.S. PATENT DOCUMENTS

| 3,817,107 | 6/1974 | Shimada et al. ...................... 73/727 |
| 4,314,225 | 2/1982 | Tominaga et al. ............... 73/727 X |
| 4,576,052 | 3/1986 | Sugiyama .......................... 73/727 X |
| 4,576,181 | 3/1986 | Wallace et al. ...................... 128/675 |
| 4,747,456 | 5/1988 | Kitagawa et al. ................ 73/766 X |

Primary Examiner—Jerry W. Myracle
Attorney, Agent, or Firm—Sughrue, Mion, Zinn, Macpeak & Seas

[57] ABSTRACT

For transducing a physical quantity into an output electric signal, a transducing device comprises lower and upper dielectric substrates and a physical quantity sensor mounted on a predetermined portion of a substrate surface of the lower dielectric substrate for sensing the physical quantity to produce a sensed signal representative of the physical quantity. The upper dielectric substrate has an upper surface and a lower surface which is on a different portion of the substrate surface. In order to receive the sensed signal and produce the output electric signal, an electric circuit is mounted on the upper surface and electrically connected to the sensor through a bonding wire which is shorter than that used in a conventional device. The electric circuit (14) receives the sensed signal through the bonding wire (15) and produces the output electrical signal. The physical quantity may be fluid pressure which a fluid has and is higher or lower than atmospheric pressure. Alternatively, the physical quantity is a velocity which is given to the device. Preferably, the physical quantity sensor has a sensor thermal expansion coefficient substantially equal to a substrate thermal expansion coefficient of the lower dielectric substrate in a direction parallel to the substrate surface.

11 Claims, 2 Drawing Sheets

TRANSDUCING DEVICE FOR ACCURATELY TRANSDUCING A PHYSICAL QUANTITY INTO AN ELECTRIC SIGNAL

BACKGROUND OF THE INVENTION

This invention relates to a transducing device for transducing a physical quantity into an output electric signal. The physical quantity may be, for example, pressure of a fluid supplied to the device or an acceleration given to the device.

Conventional transducing devices are disclosed in U.S. Pat. No. 4,576,181 issued to Wallace et al and in U.S. patent application Ser. No. 517,882 filed May 2, 1990, now U.S. Pat. No. 5,086,777 by Toshiyasu Hishii for assignment to the present assignee. According to the Hishii patent application, a transducing device comprises a dielectric substrate having a substrate surface. A semiconductor physical quantity sensor is mounted on a center portion of the substrate surface and is for sensing fluid pressure which a fluid has and is higher than atmospheric pressure. The sensor produces a sensed signal representative of the pressure. A temperature compensating circuit and a pressure sensitivity calibrating circuit etc. are disposed on the substrate surface outwardly of the center portion and are connected to the sensor by bonding wires, respectively. The dielectric substrate has an introducing hole for introducing the fluid into the transducing device.

The sensor comprises a die defining a die hollow space having an open upper end and a die height which is measured from the substrate surface. A diaphragm is disposed along the upper end. A resistor is diffused into the diaphragm and has a piezoresistive effect to produce the sensed signal when the fluid is led to the diaphragm through the introducing hole. The sensed signal is transmitted to the temperature compensating circuit and the pressure sensitivity calibrating circuit through the bonding wires and temperature compensated pressure calibrated and is produced as the output electric signal.

A first end of the bonding wire is bonded to the sensor. A second end of the bonding wire is bonded to, for example, the temperature compensating circuit. The length is about three and a half times the die height long. When the die height is, for example, 0.45 mm, it is necessary that the length is about 1.58 mm long.

It is difficult to shorten the length of the bonding wire. Moreover, the second end of the bonding wire is bonded to the temperature compensating circuit which must be located far away from the die. The transducing device therefore becomes bulky. In the transducing device, the dielectric substrate is made essentially of $Al_2O_3$ and has an $Al_2O_3$ thermal expansion coefficient of about $7 \times 10^{-6}$. The die is made essentially of silicon and has a silicon thermal expansion coefficient of about $3.5 \times 10^{-6}$. In this manner, the substrate and the die have a difference in the thermal expansion coefficients to cause thermal strain to the diaphragm. As a result, it is impossible to accurately transduce a physical quantity into the output electric signal.

SUMMARY OF THE INVENTION

It is therefore an object of the present invention to provide a compact transducing device.

It is another object of this invention to provide a transducing device of the type described, which comprises a shorter bonding wire.

It is still another object of this invention to provide a device of the type described, which can accurately transduce a physical quantity into an output electric signal.

It is yet another object of this invention to provide a transducing device of the type described, which gives little thermal strain to a physical quantity sensor.

According to this invention, a transducing device is for transducing a physical quantity into an output electric signal and comprises a lower dielectric substrate having a substrate surface, a physical quantity sensor mounted on a predetermined portion of the substrate surface for sensing the physical quantity to produce a sensed signal representative of the physical quantity, an upper dielectric substrate having an upper surface and a lower surface which is on a different portion of the substrate surface, an electric circuit mounted on the upper surface, and electric connection means for electrically connecting the sensor with the electric circuit, the electric circuit receiving the sensed signal through the connection means and producing the output electrical signal.

DESCRIPTION OF PREFERRED EMBODIMENTS

Figure 1:
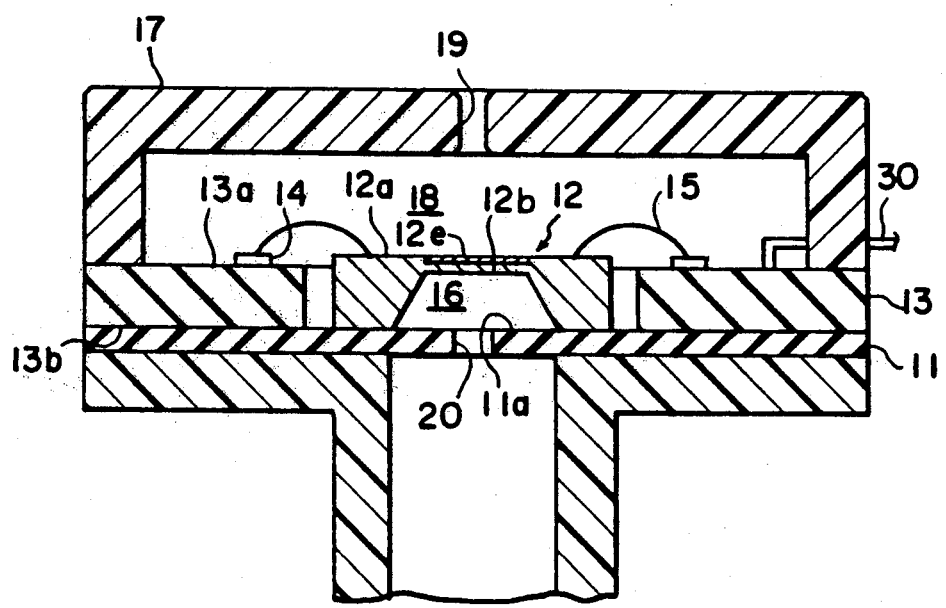
FIG. 1 is a vertical sectional view of a transducing device according to a first embodiment of the present invention.

Referring to FIG. 1, a transducing device according to a first embodiment of this invention comprises a lower dielectric substrate 11 having a substrate surface 11a. A semiconductor pressure sensor 12 is mounted on a center portion or area of the substrate surface 11a by a mounted material and is for sensing fluid pressure of a fluid which is higher than atmospheric pressure. The semiconductor pressure sensor 12 produces a sensed signal representative of the fluid pressure. An upper dielectric substrate 13 has an upper surface 13a and a lower surface 13b which is disposed on the substrate surface 11a outwardly of the center portion. The lower and the upper dielectric substrates 11 and 13 are bonded to each other by the mounted material. An electric circuit includes a compensating circuit 14 and a pressure sensitivity calibrating circuit. The compensating circuit 14, for example, is mounted on the upper surface 13a around the pressure sensor 12 and is connected to the semiconductor pressure sensor 12 by a bonding wire 15. The compensating circuit 14 receives the sensed signal through the bonding wire and produces an output signal through a conductor 30 to, for example, a monitoring device (not shown).

The lower dielectric substrate 11 is made essentially of silicon. The semiconductor pressure sensor 12 is made essentially of silicon having a sensor thermal expansion coefficient which is about $3.5 \times 10^{-6}$ and is equal to the substrate thermal expansion coefficient in a direction parallel to the substrate surface 11a.

In the manner described in the above-referenced Hishii patent application, the semiconductor pressure sensor 12 comprises a die 12a defining a die hollow space 16 having an open upper end and having a die height which is measured from the substrate surface 11a. A diaphragm 12b is disposed along the open upper end of the die hollow space. A resistor 12e is diffused into the diaphragm 12b and has a piezoresistive effect to produce the sensed signal when the diaphragm is subjected to the fluid pressure. The diffused resistor 12e is made by injecting, for example, boron into the diaphragm 12b made of silicon. In the example being illustrated, the diffused resistor 12e is depicted above the diaphragm 12b. It is possible to dispose the diffused resistor 12e below the diaphragm 12b.

The lower dielectric substrate 11 has an introducing hole 20 for introducing the fluid into the die hollow space 16 so that the diaphragm 12b senses the fluid pressure.

The substrate surface 11a and the upper surface 13a have a substrate distance therebetween. The substrate distance is, for example, 0.35 mm. The die 12a has the die height which is substantially equal to the substrate distance and may be 0.45 mm high. It is possible to shorten the length of the bonding wire 15 because the die height is substantially equal to the substrate distance. Moreover, it is possible to locate the compensating circuit 14 close to the die 12a. The transducing device therefore becomes compact.

A housing 17 defines a housing space 18 which houses the die 12a and the diaphragm 12b and covers the upper substrate 13. The housing 17 has a housing hole 19 for keeping the housing space 18 substantially at the atmospheric pressure so that the diaphragm 12b senses a difference pressure between the fluid pressure and the atmospheric pressure.

Figure 2:
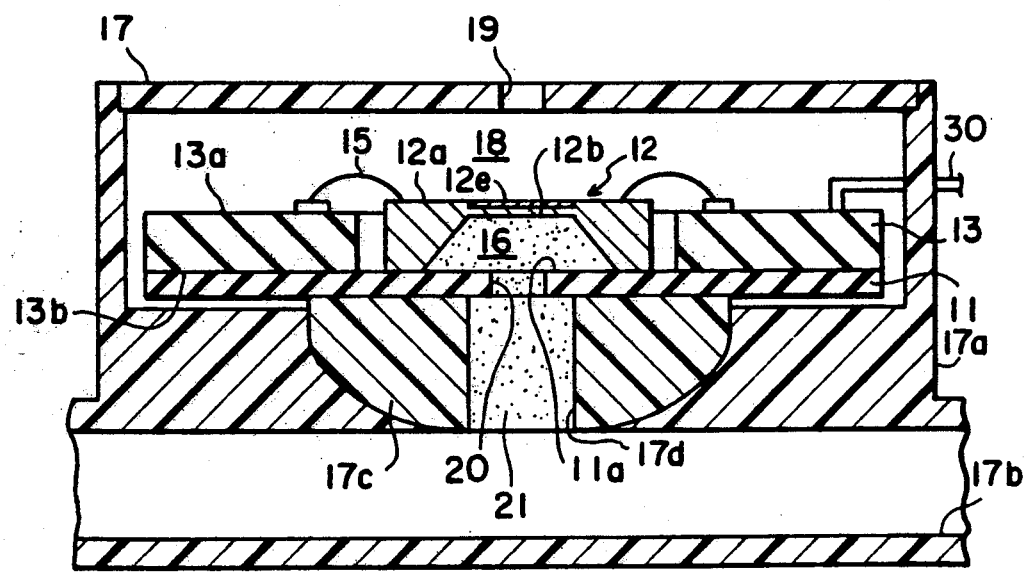
FIG. 2 is a vertical sectional view of a transducing device according to a second embodiment of the present invention.

Referring to FIG. 2, a transducing device according to a second embodiment of this invention comprises a gel material of silicon 21 in the die space 16 so as to prevent the fluid from direct contact with the diaphragm 12b.

The housing 17 comprises a base wall 17a below the lower dielectric substrate 11. The base wall 17a is formed with a fluid passageway 17b. The passageway 17b is mechanically connected to, for example, a catheter (not shown) which is inserted into a blood vessel. The base wall 17a has a gel case 17c between the lower dielectric substrate 11 and the passageway 17b. The gel case 17c is provided with an introducing port 17d for introducing the fluid into the introducing hole 20 from the passageway 17b and may be loaded with the gel material of silicon 21.

The description will now be made as regards a case where the fluid pressure is lower than atmospheric pressure.

Figure 3:
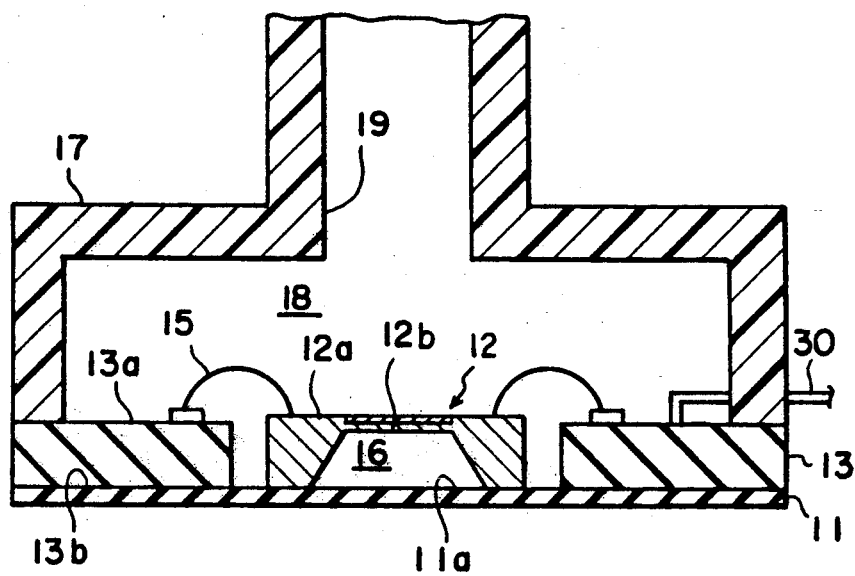
FIG. 3 is a vertical sectional view of a transducing device according to a third embodiment of the present invention.

Referring to FIG. 3, a transducing device according to a third embodiment of this invention comprises the die space 16 evacuated. The die 12a is bonded on the substrate surface 11a by an electrostatic bonding in a vacuum space. The lower dielectric substrate 11 is made of pyrex glass, for example, CORNING 7740, having a thermal expansion of about $3.25 \times 10^{-6}$ substantially nearly equal to the sensor thermal expansion. The housing hole 19 introduces the fluid so that diaphragm 12b senses the fluid pressure.

The description will now be made as regards a case where the physical quantity is a velocity given to the transducing device.

Figure 4:
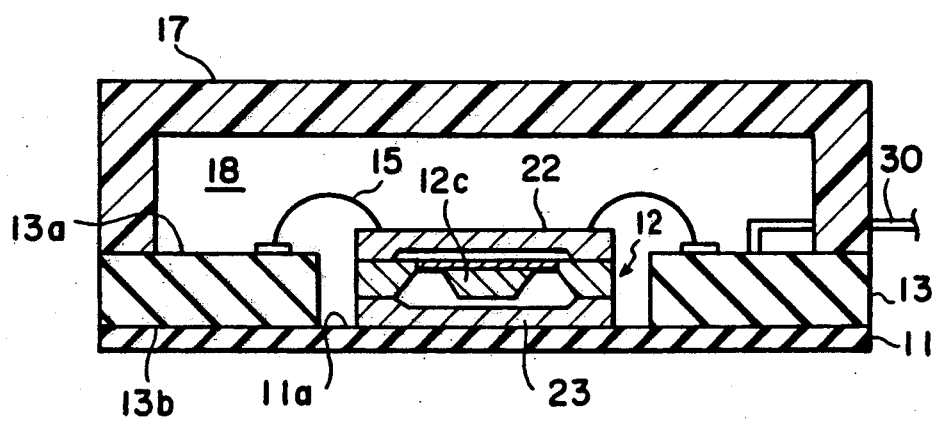
FIG. 4 is a sectional view of a transducing device according to a fourth embodiment of the present invention.

Referring to FIG. 4, a transducing device according to a fourth embodiment of this invention comprises a deadweight 12c below the diaphragm 12b. The deadweight 12c is made essentially of silicon. An upper damper 22 is disposed on the die 12a and over the deadweight 12c so as to restrict upward movement of the diaphragm 12b. A lower damper 23 is placed between the die 12a and the substrate surface 11a so as to restrict downward movement of the diaphragm 12b. Each of the upper and the lower dampers is made of silicon or pyrex glass and has a thermal expansion substantially equal or nearly equal to the substrate thermal expansion coefficient in a direction parallel to the substrate surface 11a.

What is claimed is:

1. A transducing device for transducing a physical quantity into an output electric signal, comprising:
   a first dielectric substrate (11) having a substrate surface which has a predetermined portion (11a) and a peripheral portion surrounding said predetermined portion;
   a physical quantity sensor (12) which has a predetermined height and which is mounted on said predetermined portion for sensing said physical quantity to produce a sensed signal representative of said physical quantity;
   a second dielectric substrate (13) having an upper surface (13a) and a lower surface (13b) which is mounted on said peripheral portion of said substrate surface (11a);
   an electric circuit (14) kept on said upper surface (13a) such that said electric circuit is substantially flush with said physical quantity sensor;
   bonding wires (15) for electrically connecting said sensor (12) with said electric circuit (14); and
   a housing which has a hollow space surrounding said physical quantity sensor, said electric circuit, and said bonding wires;
   said electric circuit (14) receiving said sensed signal through said bonding wires and producing said output electric signal.

2. A transducing device as claimed in claim 1, wherein said first dielectric substrate (11) has a substrate thermal expansion, said physical quantity sensor having a sensor thermal expansion coefficient substantially equal to said substrate thermal expansion coefficient in a direction parallel to said substrate surface.

3. A transducing device as claimed in claim 2, wherein said physical quantity sensor (12) for sensing a pressure comprises:
   a die (12a) having said predetermined height defining a die hollow space (16) having an open upper end;
   a diaphragm (12b) along said upper end; and
   a diffused resistor attached to said diaphragm and having a piezoresistive effect to produce said sensed signal when said diaphragm is subjected to said physical quantity.

4. A transducing device as claimed in claim 3, said pressure being fluid pressure which a fluid has and is higher than atmospheric pressure, wherein said first substrate (11) has an introducing hole (20) for introducing said fluid into said die hollow space (16) so that said diaphragm (12b) senses said fluid pressure.

5. A transducing device as claimed in claim 4, further comprising a gel material (21) in said die space (16) so as to prevent said fluid from direct contact with said diaphragm (12b).

6. A transducing device as claimed in claim 3, said pressure being a fluid pressure which a fluid has, wherein:
said housing has a hole (22) for introducing said fluid into said hollow space so that said physical quantity sensor senses said fluid pressure.

7. A transducing device as claimed in claim 3, said physical quantity being a velocity given to said transducing device, wherein said diaphragm (12b) has a deadweight (12c).

8. A transducing device as claimed in claim 7, further comprising an upper damper (22) on said die (12a) and over said diaphragm (12c) so as to restrict upward movement of said diaphragm (12b).

9. A transducing device as claimed in claim 8, wherein said upper damper (22) has an upper damper thermal expansion substantially equal to said substrate thermal expansion coefficient in a direction parallel to said substrate surface.

10. A transducing device as claimed in claim 8, further comprising a lower damper (23) between said die (12a) and said substrate surface (11a) so as to restrict downward movement of said diaphragm (12b).

11. A transducing device as claimed in claim 10, wherein said down damper (23) has a down damper thermal expansion substantially equal to said substrate thermal expansion coefficient in a direction parallel to said substrate surface.

* * * * *